United States Patent
Guenthart et al.

(10) Patent No.: US 9,385,394 B2
(45) Date of Patent: Jul. 5, 2016

(54) FUEL CELL STACK

(71) Applicant: Daimler AG, Stuttgart (DE)

(72) Inventors: Matthias Guenthart, Aarau (CH);
Ulf-Michael Mex, Stuttgart (DE);
Holger Stark, Allmersbach im Tal (DE);
Uwe Werner, Huetten (CH); Pius Kobler, Zurich (CH)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 14/371,347

(22) PCT Filed: Dec. 15, 2012

(86) PCT No.: PCT/EP2012/005179
§ 371 (c)(1),
(2) Date: Jul. 9, 2014

(87) PCT Pub. No.: WO2013/104395
PCT Pub. Date: Jul. 18, 2013

(65) Prior Publication Data
US 2014/0356753 A1    Dec. 4, 2014

(30) Foreign Application Priority Data

Jan. 10, 2012  (DE) .......................... 10 2012 000 266

(51) Int. Cl.
| | | |
|---|---|---|
| *H01M 8/24* | (2016.01) | |
| *H01M 8/02* | (2016.01) | |
| *H01M 8/10* | (2016.01) | |
| *H01M 8/12* | (2016.01) | |

(52) U.S. Cl.
CPC ............ *H01M 8/248* (2013.01); *H01M 8/0276* (2013.01); *H01M 8/247* (2013.01); *H01M 8/2475* (2013.01); *H01M 2008/1095* (2013.01); *H01M 2008/1293* (2013.01); *Y02E 60/50* (2013.01); *Y02E 60/525* (2013.01)

(58) Field of Classification Search
CPC . H01M 8/2465; H01M 8/247; H01M 8/2475; H01M 8/248
See application file for complete search history.

(56) References Cited

U.S. PATENT DOCUMENTS

| | | | |
|---|---|---|---|
| 5,993,987 A | 11/1999 | Wozniczka et al. | |
| 6,309,774 B1 | 10/2001 | Buchner et al. | |
| 2003/0104260 A1 | 6/2003 | Hill et al. | |
| 2011/0123882 A1 | 5/2011 | Kim et al. | |
| 2014/0030623 A1* | 1/2014 | Chiang et al. | 429/434 |

FOREIGN PATENT DOCUMENTS

DE           196 49 691 A1     6/1998

OTHER PUBLICATIONS

International Search Report (PCT/ISA/210) dated Jun. 3, 2013, with English translation (Nine (9) pages).
German language Written Opinion (PCT/ISA/237) dated Jun. 3, 2013 (Nine (9) pages).

* cited by examiner

*Primary Examiner* — Jane Rhee
(74) *Attorney, Agent, or Firm* — Crowell & Moring LLP

(57) ABSTRACT

A fuel cell stack includes a plurality of stacked fuel cell units and at least one stack end element that are clamped a clamping device. The clamped fuel cell units are surrounded by a housing. A circumferential seal, in particular a lip seal, which has recesses for accommodating the clamping device is situated between the housing and the at least one stack end element. The clamping device is electrically insulated at least in the area of the recesses.

Figure 1:
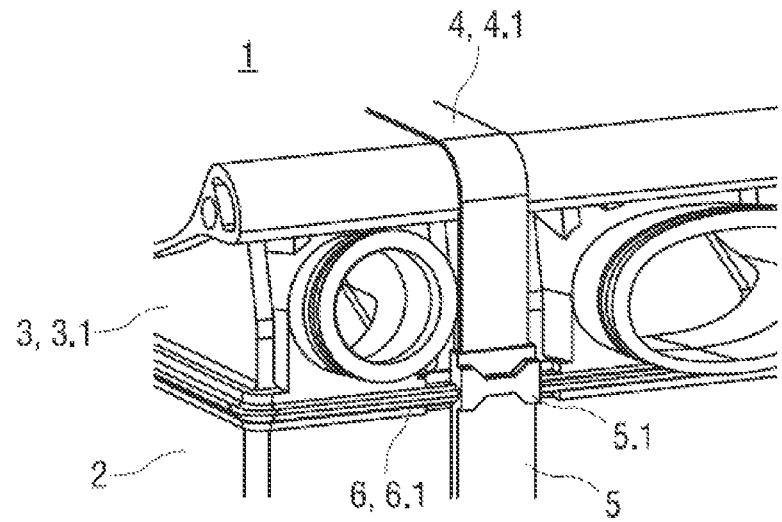

10 Claims, 4 Drawing Sheets

FUEL CELL STACK

BACKGROUND AND SUMMARY OF THE INVENTION

Exemplary embodiments of the invention relate to a fuel cell stack.

U.S. patent document US 2003/0104260 A1 describes a fuel cell system having a housing surrounding at least one first fuel cell stack and a second fuel cell stack situated peripherally with respect to the first fuel cell stack, and which presses the first and second fuel cell stacks together. To this end, the fuel cell system includes tightening straps extending completely around the housing. In addition, the housing may have a cover element that is sealed with respect to the housing.

Furthermore, US 2003/0104260 A1 describes a housing for accommodating and retaining a fuel cell stack during the manufacture of a fuel cell device composed of a plurality of fuel cell stacks, the fuel cell stacks including an end element, a flexible side wall, and a connecting element, and being held together by tightening straps. In addition, methods for manufacturing the fuel cell device are described, comprising stacking the fuel cells in the container, compressing the fuel cells, and engaging the connecting element to retain the fuel cell stack in the stacked configuration, and/or to at least partially compress the fuel cell stack.

Exemplary embodiment of the invention are directed to a fuel cell stack that is improved over the prior art.

A fuel cell stack is formed from a plurality of stacked fuel cell units and at least one stack end element. The stacked fuel cell units and the stack end element are clampable by means of at least one clamping device, and the clamped fuel cell units are surrounded by a housing. According to the invention, a circumferential seal, in particular a lip seal, which has recesses for accommodating the clamping device is situated between the housing and the at least one stack end element, the clamping device being electrically insulated at least in the area of the recesses.

The seal, which is designed as a lip seal, for example, and the electrically insulated clamping device advantageously cooperate in a sealing manner, and thus prevent penetration of moisture into the area between the fuel cell stack and the housing. The combination of the clamping device for clamping the fuel cell stack and the seal of the stack end element with respect to the housing also allows simple and cost-effective production of a sealing system for the fuel cell stack, and saves installation space.

For electrically insulating the clamping device, insulation is formed, preferably molded, onto the clamping device by means of an injection molding process, for example. The insulation is particularly preferably molded onto the clamping device in the area of the housing, thus improving electrical insulation of adjacent fuel cell units.

For positive-fit accommodation of the clamping device, the shape and/or the dimensions of the recesses correspond(s) to the shape and/or the external dimensions of the insulation molded onto the clamping device, resulting in simple installation of the fuel cell stack and ensuring the sealing effect during operation of the fuel cell stack.

The insulation of the clamping device in the area of the recesses is preferably designed in such a way that a positive-fit and/or force-fit connection is established between the insulation of the clamping device and the seal of the stack end element, which is designed in particular as a lip seal, and pretensioning is thus particularly preferably produced that brings about a sealing effect with respect to the lip seal, and thus, the housing. To increase the pretensioning, the insulation of the clamping device has a thickened area in places, in particular in the area of the recesses.

To optimize the sealing effect of the insulation of the clamping device and of the seal, the insulation and the seal are made of a rubber, a foam, polyvinyl chloride, thermoplastic polyurethane, and/or a thermoplastic polymer. These electrically insulating materials are characterized by high chemical resistance, high heat resistance, and good corrosion properties.

The clamping device includes at least one strip- or band-shaped tightening strap encircling the stacked fuel cell units and the stack end element. This type of tightening strap has low weight and low space requirements, and is also easy and cost-effective to manufacture and install. The clamping device particularly preferably includes multiple tightening straps, thus advantageously optimizing compression of the fuel cell stack and increasing a sealing effect between the fuel cell stack and the housing.

In one particularly preferred embodiment of the invention, the tightening strap is made of glass fiber or stainless steel. Materials made of glass fiber and stainless steel are resistant to corrosion and chemical attack, and in particular glass fiber materials also have a high modulus of elasticity.

The stack end element of the fuel cell stack particularly preferably forms a cover of the housing, which in particular is designed as a housing that is open on one side. The requirements for installation space and components are thus optimized. The stack end element therefore meets multiple functions, in which it is used as an end-face delimitation of the stacked fuel cell units and also as a cover element of the fuel cell stack.

Alternatively or additionally, the housing is designed as a housing which is open on two sides, and the fuel cell stack includes two stack end elements, one of the stack end elements forming the cover, and the other of the stack end elements forming the base, of the fuel cell stack.

BRIEF DESCRIPTION OF THE DRAWING FIGURES

Figure 2:
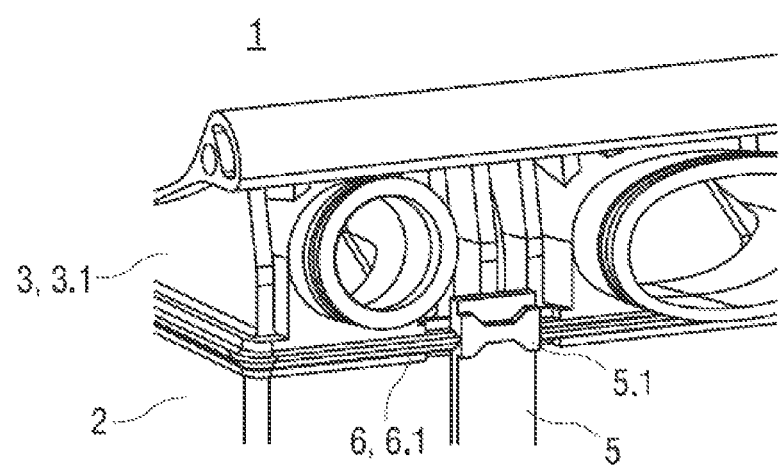
Figure 3:
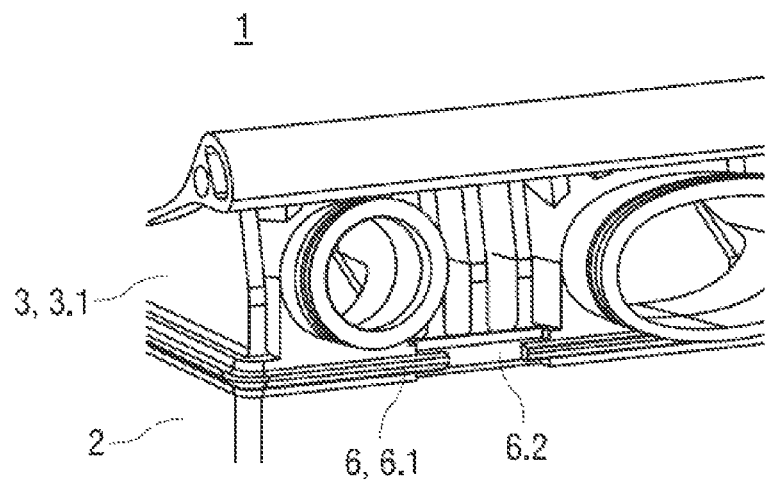
Figure 4:
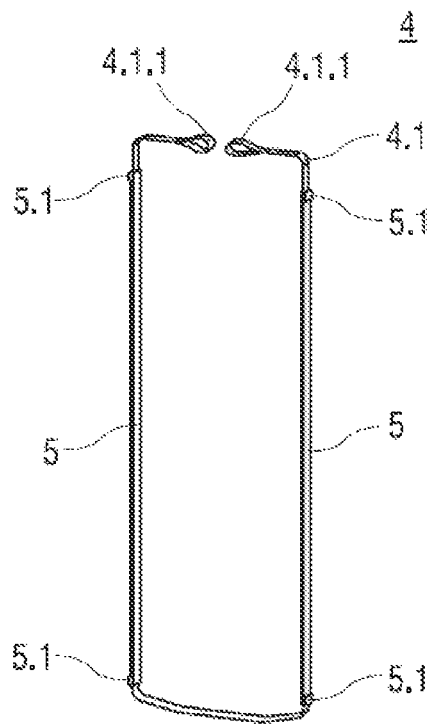
Figure 5:
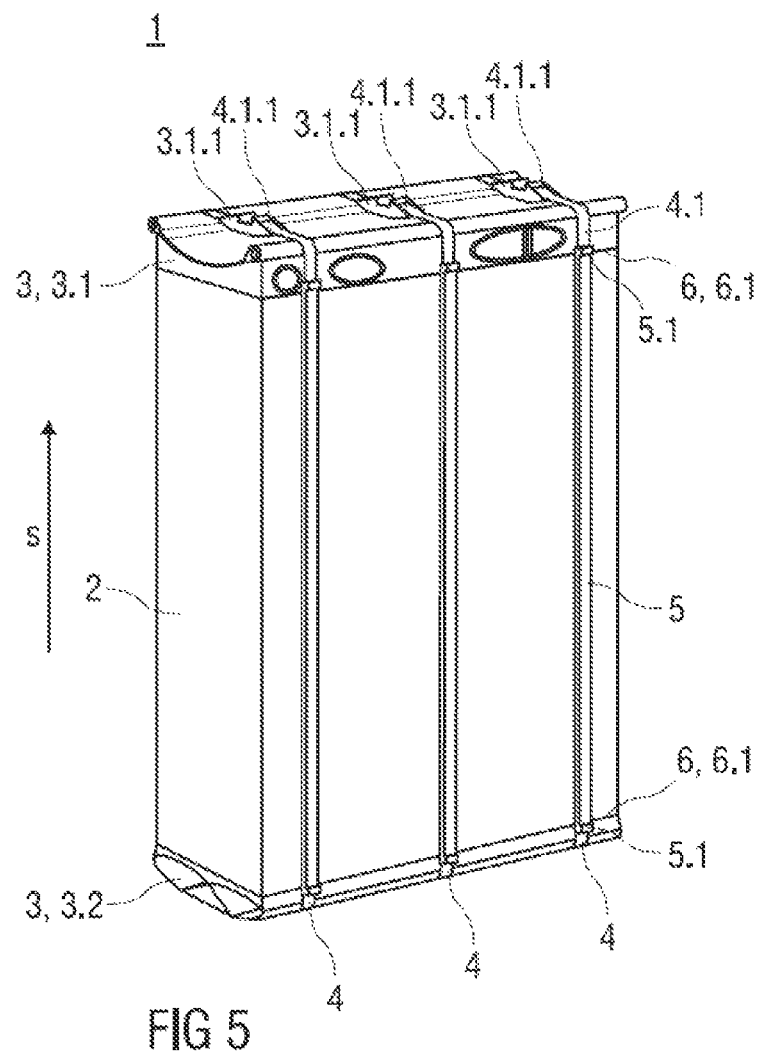
Figure 6:
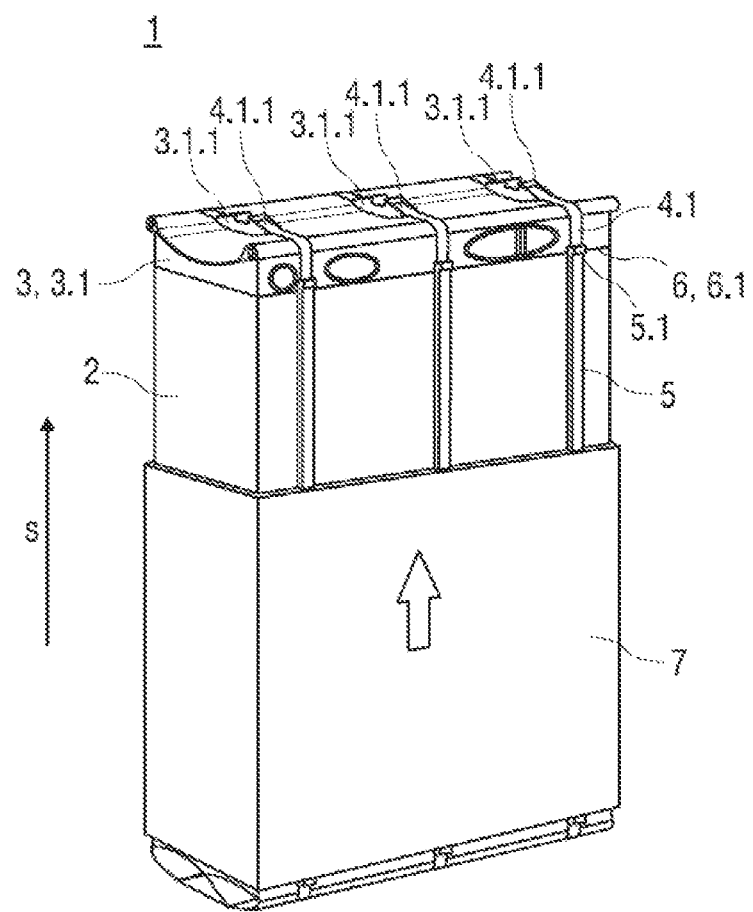

Exemplary embodiments of the invention are explained in greater detail below with reference to the drawings, which show the following:

FIG. 1 schematically shows a perspective view of a detail of a fuel cell stack having a housing, a stack end element, and a clamping device with molded-on insulation, FIG. 2 schematically shows a perspective view of the detail according to FIG. 1, without a clamping device, FIG. 3 schematically shows a perspective view of the detail according to FIG. 1, without a clamping device and without insulation, FIG. 4 schematically shows a perspective view of a clamping device having molded-on insulation, FIG. 5 schematically shows a perspective view of a fuel cell stack in an installed state, and FIG. 6 schematically shows a perspective view of the fuel cell stack according to FIG. 5, the fuel cell stack being provided with a housing.

Mutually corresponding parts are provided with the same reference numerals in all the figures.

DETAILED DESCRIPTION

FIGS. 1 through 3 show a perspective detail of a fuel cell stack 1 having a plurality of stacked fuel cell units 2, two stack end elements 3, and a clamping device 4 with insulation 5 which surrounds the clamping device in parts, FIG. 2 showing the fuel cell stack 1 only with insulation 5 and without the clamping device 4, and FIG. 3 showing the fuel cell stack 1 without the clamping device 4 and without insulation 5. FIG. 4 shows a perspective view of a single clamping device 4, FIG. 5 shows a fuel cell stack 1 in an installed state, and FIG. 6 shows the fuel cell stack 1 according to FIG. 5, which is provided with a housing 7, the installation of the housing 7 being represented by an arrow.

The fuel cell stack 1 is composed of the plurality of stacked fuel cell units 2, which are designed, for example, as high-temperature fuel cell units, such as solid oxide fuel cells, or also low-temperature fuel cell units, such as polymer electrolyte fuel cells, whereby polymer electrolyte fuel cells (PEMFC) are preferred.

The stacked fuel cell units 2 and the stack end elements 3 are clamped together by means of the clamping device 4. For this purpose, the clamping device 4, as illustrated in FIG. 5, has multiple, in particular three, band- or strip-shaped clamping elements, referred to below as tightening straps 4.1, which in each case encircle the fuel cell units 2 and the stack end elements 3 and clamp same against one another, and which are separated at a distance from one another in a direction transverse to the stack direction s. Tightening straps 4.1 of this type have low weight and low space requirements, and in addition are easy and cost-effective to manufacture and install. Furthermore, such a design and configuration of the clamping device 4 allow optimal transmission of force into the fuel cell stack 1.

As illustrated in FIG. 4, the tightening straps 4.1 extend around one of the stack end elements 3, in particular the lower end plate 3.2. The ends or end regions 4.1.1 of the tightening straps 4.1 have a loop- or hook-shaped design, or are provided with suspension loops or suspension hooks. The upper end plate 3.1, situated opposite from the lower end plate 3.2, has connecting elements 3.1.1 with a design which corresponds to the loop- or hook-shaped end regions 4.1.1 of the tightening straps 4.1, so that the connecting elements and the loop- or hook-shaped end regions form a positive-fit and/or force-fit connection with one another.

In one possible embodiment, the connecting elements 3.1.1 have a separate design and are connected, in particular screwed, to the stack end element 3 in a positive-fit, integrally joined, and/or force-fit manner. Alternatively, the connecting elements 3.1.1 may be integrated into the stack end element 3, for example molded onto same. In particular, the connecting elements 3.1.1 and the stack end element 3 may form an integrated component, such as a molded component. For example, the connecting elements 3.1.1 are formed as a loop protruding into the opening in the stack end element 3, or as a hook protruding into the opening.

As the result of forming the end regions 4.1.1 of the tightening straps 4.1 as hooks or loops, the tightening straps 4.1 may be easily detached from the correspondingly designed connecting element 3.1.1 of the stack end element 3.

In the installed state of the fuel cell stack 1, the stack end elements 3 and the fuel cell units 2 are clamped together by means of the tightening straps 4.1, since the tightening straps 4.1 transmit tensile forces for clamping the fuel cell stack 1, via the fuel cell stack, to the stacked fuel cell units 2 and to the stack end elements 3.

The stacked fuel cell units 2 are preferably surrounded, at least in sections, by the housing 7 illustrated in FIG. 6. Preferably all of the fuel cell units 2 which are stacked in the fuel cell stack 1 are surrounded by the housing 7 (not illustrated). The housing 7 is designed as a housing 7 which is open on both sides, and in the installed state (the installation of the housing 7 is represented by an arrow in FIG. 6) the housing with its open ends in each case adjoins one end or one surface side of a stack end element 3, one of the stack end elements 3 delimiting an upper end-face side of the fuel cell stack 1 in the form of an upper end plate 3.1, and the other of the stack end elements 3 delimiting a lower end face of the fuel cell stack 1 in the form of a lower end plate 3.2.

It is particularly preferred that the upper end plate 3.1 forms a cover, and the lower end plate 3.2 forms a base, of the housing 7. Alternatively, the housing 7 may be designed as a housing 7 which is open on one side, the open end being delimited by one of the stack end elements 3.

At least one of the stack end elements 3 is preferably manufactured in one piece as a metal-plastic hybrid component in the plastic injection molding process.

The design of the stack end element 3 as a metal-plastic hybrid component allows the beneficial properties of two different materials to be combined. By means of the metal part, clamping forces may be introduced into the fuel cell units over a large surface area, and connecting points to support structures, such as the vehicle body, may be implemented. In addition, the dimensional stability and heat stability of the metal part are very good. A metallic alloy such as steel is also suitable as a metal material.

Electrical insulation of the fuel cell stack 1 with respect to the surroundings is achievable by means of a reinforcing part which is molded onto the metal part. In addition, an interface to the housing 7 of the fuel cell stack 1, discharge/supply of gaseous or liquid media from/to the fuel cell stack 1, and insulation of media, electrically as well as for protection from corrosion, are achievable by means of the reinforcing part. The reinforcing part thus optimizes the metal part. In particular a thermoplastic material is suited as a plastic or an organic polymer.

A circumferential seal 6 is situated, in particular molded on, between the housing 7 and the upper end plate 3.1. In one possible illustrated embodiment, the circumferential seal 6 is designed as a lip seal 6.1. Alternatively, the circumferential seal may be designed as a ring seal.

The upper end plate 3.1 is thus preferably sealed with respect to the housing 7. Another lip seal 6.1 is particularly preferably situated between the lower end plate 3.2 and the housing 2, so that the lower end plate 3.2 is sealed with respect to the housing 7.

The lip seal 6.1 is preferably made of an electrically insulating material, in particular synthetic rubber, for example ethylene propylene diene monomer, nitrile butadiene rubber, hydrogenated nitrile rubber, silicone rubber, fluorine rubber, acrylate rubber, perfluorinated rubber, polychloroprene rubber, chlorosulfonyl polyethylene rubber, polyester urethane rubber, butyl rubber, or natural rubber or cellular rubber, foam, polyvinyl chloride, thermoplastic elastomer, or thermoplastic polyurethane. These electrically insulating materials are characterized by high chemical resistance, heat resistance, and good corrosion properties.

In the present exemplary embodiment, the lip seal 6.1 includes recesses 6.2 for accommodating the tightening straps 4.1, the recesses being enclosed by the housing 7 in the area of the fuel cell units 2, and being externally situated in the region of the lip seal 6.1.

For this purpose, the tightening straps 4.1 in each case have the molded-on insulation 5 at least in the area of the recesses 6.2 in the lip seal 6.1. The insulation 5 preferably extends over the area of the tightening straps 4.1 which rests against the fuel cell units 2, as illustrated in FIGS. 4 and 5, thus improving electrical insulation of adjacent fuel cell units 2.

The recesses 6.2 preferably have a shape and/or dimensions that correspond(s) to the shape and/or external dimensions of the insulation 5, so that the insulation 5 is situated in the recess 6.2 in a form-fit and/or force-fit manner, thus particularly preferably providing pretensioning, and thus a sealing effect, with respect to the lip seal 6.1 and with respect to the housing 7. The insulation 5 has a thickened area 5.1 in the area of the recesses 6.2 for increasing the pretensioning, as shown in FIGS. 1, 2, 4, 5, and 6.

The insulation 5 is preferably made of the same material as the lip seal 6.1, or another of the materials for the lip seal 6.1 mentioned above. The insulation 5 is preferably applied to the tightening strap 4.1 by means of an injection molding process. In the present exemplary embodiment, the insulation 5 completely surrounds the tightening strap 4.1 in the specified areas.

In addition, two oppositely situated recesses 6.2 are provided in each case for a tightening strap 4.1, since the tightening straps 4.1 are situated so as to encircle least the housing 2 and the lip seal 6.1 along a direction extending in the stack directions. In an alternative or additional embodiment, a lip seal 6.1 that is situated between the housing 2 and the other of the stack end elements 3, for example the lower end plate 3.2, has corresponding recesses 6.2 for accommodating the tightening straps 4.1.

The insulation 5 and the lip seal 6.1 advantageously cooperate in a sealing manner, and thus prevent penetration of moisture into the area between the stack end element 3 and the housing 7. The combination of the clamping device 4 for clamping the fuel cell stack and the seal also allows simple and cost-effective production of a sealing system for the fuel cell stack 1, since no joining processes are necessary, and also saves installation space.

In addition, the sealing system may be used regardless of the stack height of the fuel cell stack 1.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof

LIST OF REFERENCE NUMERALS

1 Fuel cell stack
2 Fuel cell units
3 Stack end elements
3.1 Upper end plate
3.1.1 Connecting elements
3.2 Lower end plate
4 Clamping device
4.1 Tightening straps
4.1.1 End regions
5 Insulation
5.1 Thickened area
6 Seal
6.1 Lip seal
6.2 Recesses
7 Housing
s Stack direction

The invention claimed is:

1. A fuel cell stack, comprising:
a plurality of stacked fuel cell units;
at least one stack end element;
a clamping device that clamps the stacked fuel cell units and the stack end element;
a housing that surrounds at least the clamped fuel cell units; and
a circumferential lip seal, which has recesses configured to accommodate the clamping device, is situated between the housing and the at least one stack end element and extends circumferentially around the at least one stack end element, wherein the clamping device is electrically insulated at least in the area of the recesses.

2. The fuel cell stack of claim 1, wherein at least sections of the clamping device included molded insulation.

3. The fuel cell stack of claim 2, wherein in an area of the recesses the insulation is configured in such a way that a positive-fit or force-fit connection is established between the insulation and the circumferential lip seal.

4. The fuel cell stack of claim 3, wherein the insulation has a thickened area in the area of the recesses.

5. The fuel cell stack of claim 2, wherein the insulation is made of a rubber, a foam, polyvinyl chloride, thermoplastic polyurethane, or a thermoplastic polymer.

6. The fuel cell stack of claim 1, wherein the circumferential lip seal is made of a rubber, a foam, polyvinyl chloride, thermoplastic polyurethane, or a thermoplastic polymer.

7. A fuel cell stack, comprising:
a plurality of stacked fuel cell units;
at least one stack end element;
a clamping device that clamps the stacked fuel cell units and the stack end element;
a housing that surrounds at least the clamped fuel cell units; and
a circumferential lip seal, which has recesses configured to accommodate the clamping device, is situated between the housing and the at least one stack end element, wherein the clamping device is electrically insulated at least in the area of the recesses;
wherein the clamping device includes at least one tightening strap encircling the plurality of stacked fuel cell units and the stack end element.

8. The fuel cell stack of claim 7, wherein the tightening strap is made of glass fiber or stainless steel.

9. The fuel cell stack of claim 1, wherein the at least one stack end element forms a cover of the housing.

10. The fuel cell stack of claim 9, wherein the at least one stack end element comprises two stack end elements, one of the stack end elements forming the cover of the housing, and the other of the stack end elements forming the base of the housing.

* * * * *